United States Patent
Sakata et al.

(10) Patent No.: US 8,983,756 B2
(45) Date of Patent: Mar. 17, 2015

(54) INTERNAL COMBUSTION ENGINE

(75) Inventors: Tomohiro Sakata, Atsugi (JP); Daisuke Tanaka, Ebina (JP); Futoshi Yoshimura, Yamato (JP); Ryo Uchida, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/111,094

(22) PCT Filed: Mar. 15, 2012

(86) PCT No.: PCT/JP2012/056731
§ 371 (c)(1),
(2), (4) Date: Nov. 12, 2013

(87) PCT Pub. No.: WO2012/140986
PCT Pub. Date: Oct. 18, 2012

(65) Prior Publication Data
US 2014/0373805 A1  Dec. 25, 2014

(30) Foreign Application Priority Data
Apr. 12, 2011 (JP) ................. 2011-088122

(51) Int. Cl.
*F02B 1/10* (2006.01)
*F02B 17/00* (2006.01)

(52) U.S. Cl.
CPC .................. *F02B 17/005* (2013.01)
USPC .............. 701/105; 123/298; 123/305

(58) Field of Classification Search
USPC .................. 701/105; 123/298, 305
See application file for complete search history.

(56) References Cited

U.S. PATENT DOCUMENTS

| 6,802,296 | B2 * | 10/2004 | Arndt et al. | 123/299 |
| 6,883,491 | B2 * | 4/2005 | Arndt et al. | 123/305 |
| 7,165,526 | B2 * | 1/2007 | Nakayama et al. | 123/298 |
| 7,216,624 | B2 * | 5/2007 | Mizobuchi et al. | 123/305 |

(Continued)

FOREIGN PATENT DOCUMENTS

| EP | 0838584 A2 | 4/1998 |
| EP | 2105595 A1 | 9/2009 |

(Continued)

OTHER PUBLICATIONS

Extended European Search Report for the corresponding European patent application No. 12771579.5 issued on Aug. 25, 2014.

(Continued)

*Primary Examiner* — Erick Solis
(74) *Attorney, Agent, or Firm* — Global IP Counselors, LLP

(57) ABSTRACT

An internal combustion engine has a cylinder, a cylinder head mounted to the cylinder, a piston disposed in the cylinder, and a fuel injection valve. A combustion chamber is defined by the piston, the cylinder head and the cylinder. The fuel injection valve has a plurality of injection holes that injects fuel directly inside the cylinder from a side of the combustion chamber. The injection holes inject fuel in a spray shape with an overall shape, which is formed by a plurality of sprays being injected from the injection holes. The overall shape expands toward the cylinder head and forms one part of a conical shape that is dented near the piston. Central axes of some of the injection holes are oriented toward a boundary portion near the exhaust valve formed at a crown surface of the piston and an inner wall of the cylinder when fuel is injected.

13 Claims, 12 Drawing Sheets

(56) References Cited

U.S. PATENT DOCUMENTS

| | | | |
|---|---|---|---|
| 7,543,560 B2 * | 6/2009 | Kihara et al. | 123/298 |
| 2007/0068482 A1 * | 3/2007 | Yamashita et al. | 123/276 |
| 2008/0135016 A1 | 6/2008 | Ashizawa et al. | |

FOREIGN PATENT DOCUMENTS

| | | |
|---|---|---|
| JP | 2008-223677 A | 9/2008 |
| JP | 2009-121251 A | 6/2009 |
| JP | 2009-228579 A | 10/2009 |
| WO | 02/02929 A1 | 1/2002 |

OTHER PUBLICATIONS

An English translation of the Russian Office Action for the corresponding Russian patent application No. 2013150196/06(078191) issued on Dec. 5, 2014.

* cited by examiner

INTERNAL COMBUSTION ENGINE

CROSS-REFERENCE TO RELATED APPLICATIONS

This application is a U.S. National stage application of International Application No. PCT/JP2012/056731, filed Mar. 15, 2012, which claims priority claims priority under to Japanese Patent Application No. 2011-88122, filed in Japan on Apr. 12, 2011.

BACKGROUND

1. Field of the Invention

The present invention relates to an internal combustion engine.

2. Background Information

There is known a direct-injection spark-ignited internal combustion engine wherein a fuel injection valve has a plurality of nozzle holes at the tip portion thereof and is arranged to inject fuel directly inside the combustion chamber of a cylinder. The tip end portion of the fuel injection valve faces the inside of the combustion chamber from between the two adjacent intake ports formed at the edge of the roof of the cylinder head. During the intake stroke, when the crank angle is 140 degrees after top dead center, the downward spray collides with the cavity closer to the intake side than the exhaust side from the lower injection nozzle hole which among the plurality of nozzle holes jets fuel the furthest downward (Japanese Unexamined Patent Publication No. 2009-228579).

However, there was the possibility that the large amount of fuel that would stick to the piston would therefore increase the amount of particulate matter (PM) in the exhaust gas.

The problem, which the present invention aims to address, is providing an internal combustion engine capable of reducing the amount of particulate matter included in the exhaust gas.

The present invention addresses the problem by orienting the central axis of the spray injected from the fuel injection valve towards the boundary portion opposite the fuel injection valve at the piston position formed by the crown surface of the piston and the inner wall of the cylinder when fuel is injected.

SUMMARY

According to the present invention, the distance from the location from which fuel is injected to the boundary portion opposite the fuel injection valve formed by the crown surface of the piston and the inner wall of the cylinder increases during fuel injection, and thus it is possible to control adherence of fuel to the crown surface of the piston and thereby reduce the amount of particulate matter in the exhaust gas.

BRIEF DESCRIPTION OF THE DRAWINGS

Referring now to the attached drawings which form a part of this original disclosure.

DETAILED DESCRIPTION OF THE EMBODIMENTS

Embodiments of the invention will be explained below based on the attached drawings.

Figure 1:
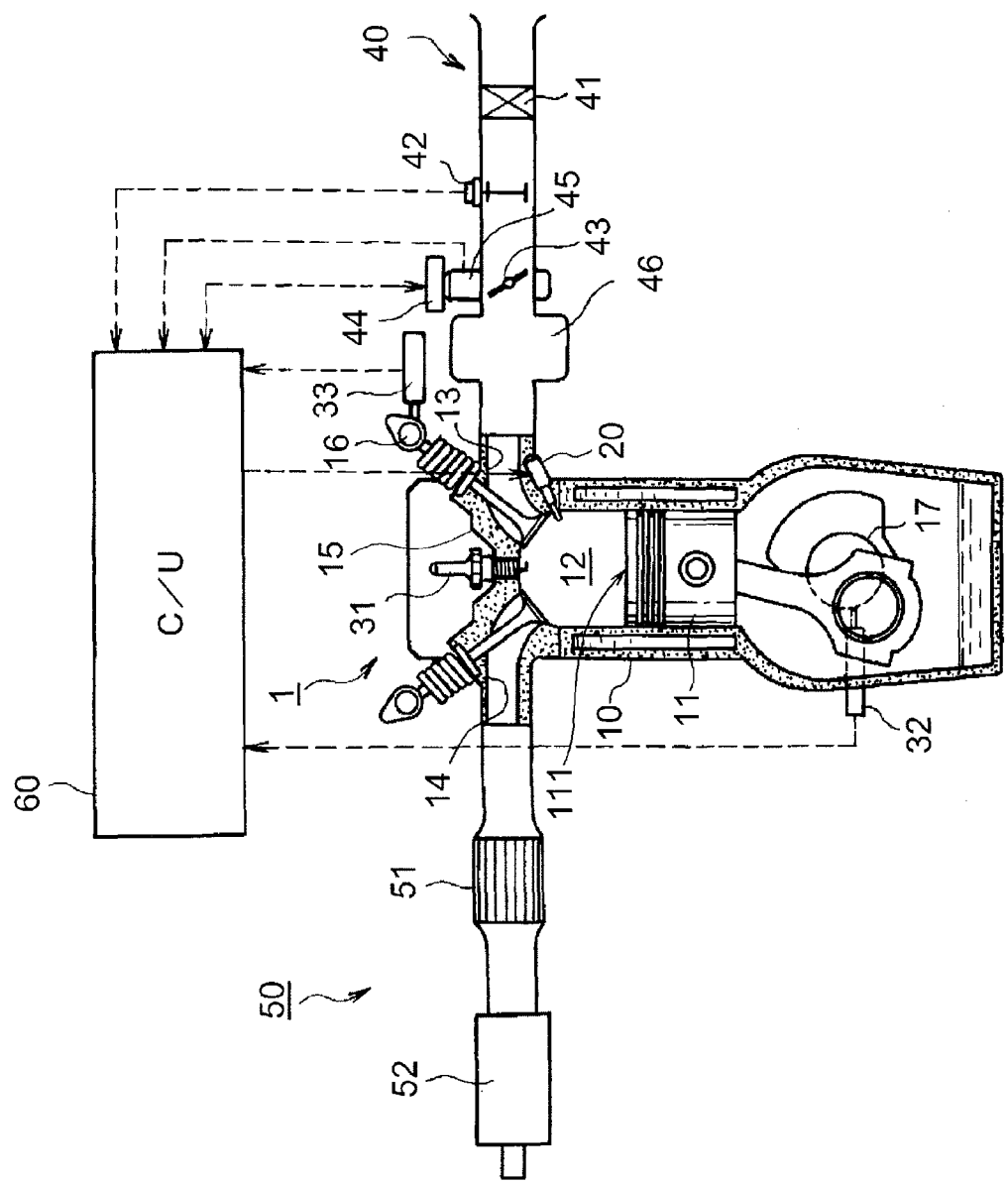
FIG. 1 is a block diagram of an engine according to an embodiment of the present invention.

FIG. 1 is a block diagram of an engine according to an embodiment of the present invention. The engine in the present embodiment is, for example, a cylindered direct-injection engine. As illustrated in FIG. 1, the engine is equipped with a fuel injection valve 20 that is provided to face the inside of a combustion chamber 12 in each of the cylinders and a spark plug 31. Only one cylinder is illustrated in FIG. 1; the number of cylinders is not particularly limited in the present invention.

The combustion chamber 12 is the space surrounded by a cylinder 10, the crown surface of a piston 11 which reciprocates inside the cylinder 10, and a cylinder head 15 which is provided with an intake valve 13 and an exhaust valve 14. The fuel injection valve 20 is placed at the top part of the bore of the cylinder 10 facing the fuel chamber 12 from the cylinder head 15 in order to inject fuel inside the combustion chamber 12 directly from the side. The spark plug 31 is mounted to face the combustion chamber 12 of each of the cylinders 12 for igniting the introduced gaseous mixture on the basis of an ignition signal from an engine control unit 60. Finally, a recessed cavity 111 is formed in the crown surface of the piston 11.

The fuel injection valve 20 opens in accordance with a drive pulse signal set within the control unit 60 and injects fuel of a predetermined amount and pressure into the combustion chamber 12. The spark plug 31 ignites the gaseous mixture filling the combustion chamber 12 on the basis of the ignition signal from the control unit 60.

The engine is equipped with a crank angle sensor 32 and a cam angle sensor 33. The crank angle sensor outputs a unit angle signal for the crank angle synchronized with the rotation of the crankshaft 17. Meanwhile the cam angle sensor 33 outputs a reference signal for every single rotation of the camshaft 16 (in other words, corresponding to every time the crank angle is 720 degrees). Both the crank angle sensor 32 and the cam angle sensor 33 are connected to the control unit 60. The control unit 60 detects the engine speed and the position of the piston 11 on the basis of the unit angle signal output from the crank angle sensor 32. Additionally, the control unit 60 identifies which of the cylinders is on its expansion stroke on the basis of the unit angle signal output from the crank angle sensor 32, and the reference signal output from the cam angle sensor 33.

An intake passage 40 communicates with the intake valve 13 of the engine, and is provided with an air filter 41, an air flow meter 42, a throttle valve 43, and an intake manifold 46. The throttle valve 43 is provided with a throttle valve control device 44 for controlling the position of the throttle valve 43 by way of an actuator such as a DC motor and the like. The control unit 60 calculates the torque needed on the basis of the operation position of the accelerator pedal that is detected by an accelerator pedal position sensor (not shown), and outputs a drive signal to the throttle valve control device 44. The throttle valve control device 44 electronically controls the position of the throttle valve 43 on the basis of the drive signal from this control valve 60. The throttle valve 43 is further provided with a throttle position sensor 45 for detecting the position of the throttle valve 43. The throttle position sensor 45 is connected to the control unit 60 and outputs the detection signal to the control unit 60.

An exhaust purification catalyst 51 for purifying the exhaust and a muffler 52 for reducing the noise as well as cooling the exhaust are provided along the exhaust passage 50 which communicates with the exhaust valve 14 of the engine.

The control unit 60 is made from a microcontroller that contains a CPU, ROM, RAM, analog-to-digital converter, and an output interface, and is connected to various sensors described above. The control unit 60 controls the throttle valve 43 via the throttle valve control device 44 in accordance with the drive state detected on the basis of the signals from the various sensors; drives the integrated fuel injector 20 to thereby control the amount of fuel injected, and sets the ignition time to thereby control the ignition of the spark plug during the set ignition time.

On activation the control unit 60 initiates stratified-charge combustion. In this example, for one cycle, the control unit 60 directs a first injection during an initial injection period which is close to 90 degrees after top dead center (for example, when the crank angle is between 90 to 120 degrees after top dead center during the intake stroke) and directs a second injection when the crank angle is between 300 to 340 degrees after top dead center during the intake stroke. Moreover, the control unit 60 directs homogeneous combustion for times other than activation. In this example, for one cycle the control unit 60 directs injection when the crank angle is 80 to 240 degrees after top dead center during the intake stroke.

Figure 2:
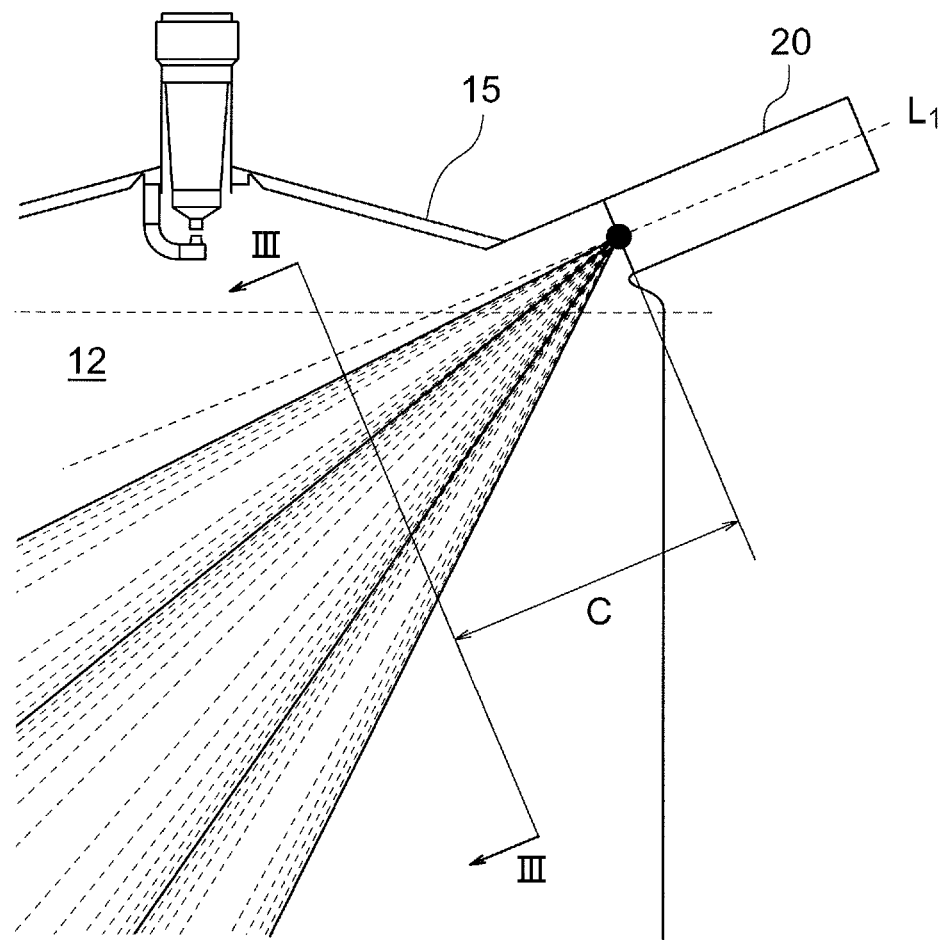
FIG. 2 is an exploded view of the portions surrounding the fuel injection valve in FIG. 1 and shows the spray injected from the fuel injection valve.
Figure 3:
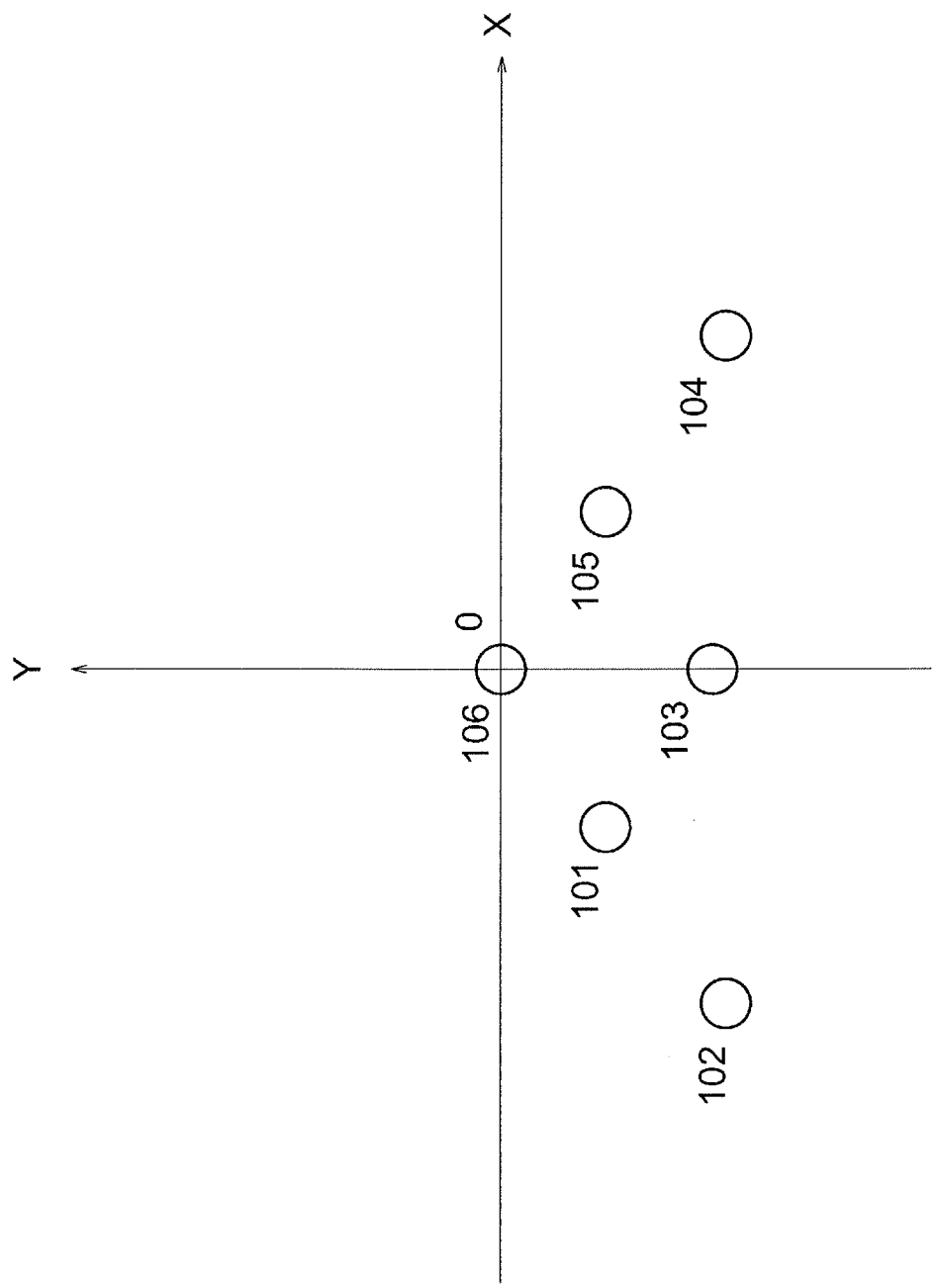
FIG. 3 is a partial cross-sectional view along the line III-III in FIG. 2.
Figure 4:
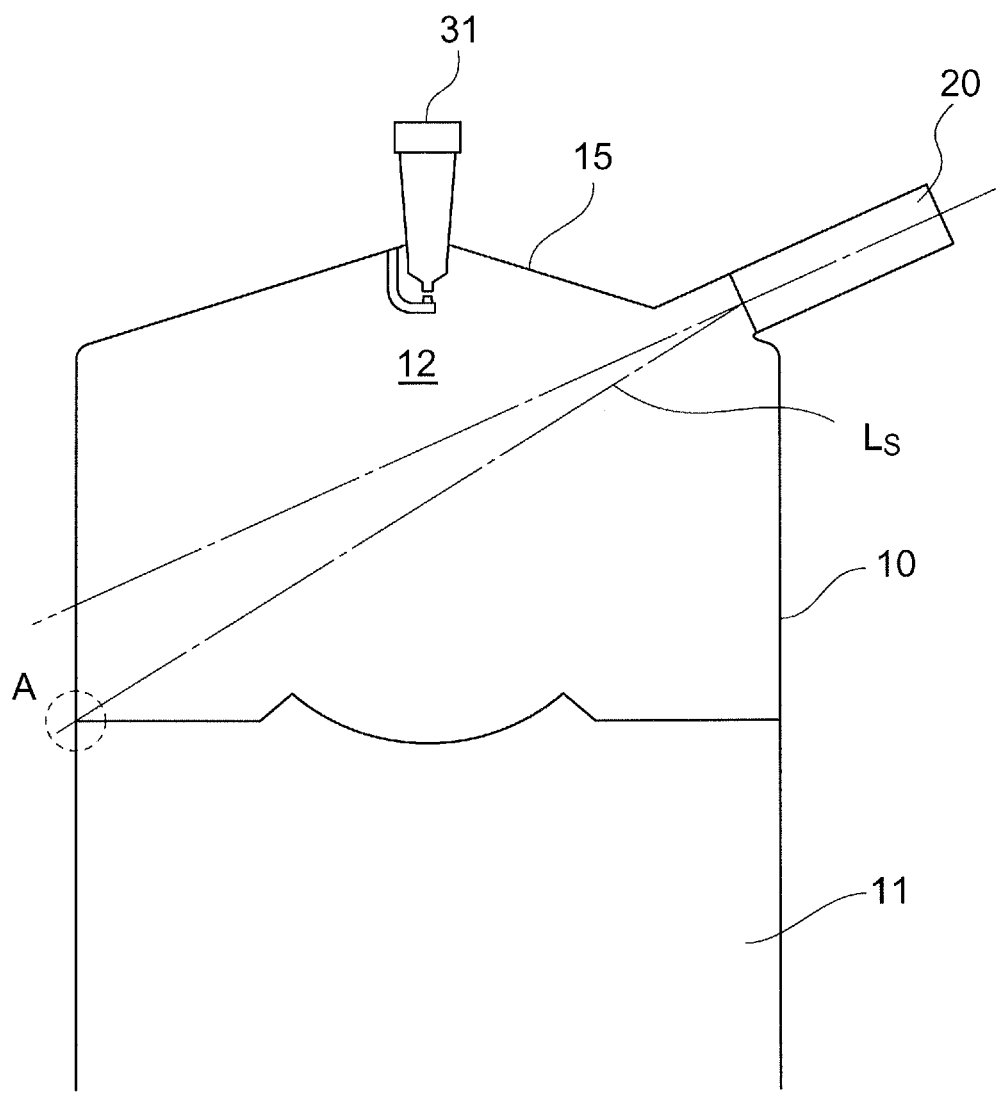
FIG. 4 is a diagram showing a view of the engine and is used to describe the relationship between the position of the piston in FIG. 1 and the central axis of the spray injected from the fuel injection valve.

Next, the characterizing portion of the present invention, that is the injection direction of the fuel injection valve 20 will be described using FIG. 2 through FIG. 4. FIG. 2 illustrates the fuel injection valve 20 in FIG. 1 as well as its surrounding combustion chamber 12, and is for describing the spray injected from the fuel injection valve 20. FIG. 3 is a partial cross-sectional view along the line III-III in FIG. 2 and is for describing the central axis of the spray injected from the injection hole of the fuel injection valve 20. FIG. 4 illustrates one portion of a block diagram for the engine when viewing a cross-section including the central axis of the cylinder. FIG. 4 is used for describing the relationship between the position of the piston and the center of the spray injected from the fuel injection valve 20.

A plurality of injection holes are provided in the fuel injection valve 20; and the fuel injection valve 20 may be provided with, for example, five or six injection holes. In the description given below the fuel injection valve has having six injection holes.

The spray of fuel from the injection holes 101~106 is injected from the tip portion of the fuel injection valve 20 and spreads out to form a cone shape. The overall spray which contains all the sprays from the injection holes 101~106 is injected so that based on the arrangement of the nozzle holes and the spray axis (later described), the overall spray shape formed by all the sprays expands towards the cylinder head (upward) and spreads out so as to form one part of a conical shape that is dented near the piston (downward).

As shown in FIG. 2, when the central axis of the fuel injection valve 20 is taken in the longitudinal direction of the fuel injection valve 20 (straight line $L_1$ in FIG. 2), the central axis of the fuel injection valve 20 (straight line $L_1$ in FIG. 2) is oriented more toward the piston in the radial direction of the bore of the cylinder 10. Therefore the six injection holes may be provided at the tip portion of the fuel injection valve 20 facing the combustion chamber 12 so that when the cross-section of the spray injected from the fuel injection valve 20 is observed at a position which is a predetermined distance (C in FIG. 2) along the central axis away from the tip portion of the fuel injection valve 20, the central axis of the sprays from the six injection holes will be arranged as illustrated in FIG. 3. Next the injection hole of the fuel injection valve 20 or the tip portion of the fuel injection valve 20 may be configured so that the placement of the central axis of the six sprays corresponds substantially with the placement of the injection holes of the fuel injection valve 20 even when the cross-section of an arbitrary spray is viewed. In FIG. 3 the X-axis is the axis in a direction perpendicular to the line III-III and the straight line $L_1$ in FIG. 2. Additionally, towards the cylinder head 15 is the positive direction of the Y-axis and towards the piston 11 is the negative direction of the Y-axis.

The placement of the sprays injected from the six injection holes 101~106 are along the line III-III in the cross-section as shown in FIG. 3. This placement is substantially the same as the placement of the injection holes 101~106 in the tip portion of the fuel injection valve 20; the axial line for each of the sprays injected from the injection holes 101~106 spread out and progress while mutually maintaining a similar shape. Five injection holes 101, 102, 104, 105, 106 of the six injection holes 101~106 are arranged in the shape of an upward oriented triangle on the tip portion of the fuel injection valve 20. Further, of the five injection holes arranged in the shape of the triangle, the injection hole 106, which is placed at the topmost part of the triangle on the tip portion of the fuel injection valve 20 is placed closest to the cylinder head 15. For the remaining injection holes arranged in the shape of the triangle, the injection hole 102 is placed at the bottom left vertex of the triangle, the injection hole 104 is placed at the bottom right vertex of the triangle, the injection hole 101 is placed between the injection hole 106 and the injection hole 102, while the injection hole 105 is placed between the injection hole 106 and the injection hole 104. The injection hole 101 and the injection hole 105, and the injection hole 102 and the injection hole 104 are arranged symmetrically to each other with respect to the straight line connecting the injection hole 103 and the injection hole 106. On the tip portion of the fuel injection valve 20 the injection hole 103 is placed lower than the injection hole 106, and placed closer to the piston 11.

For example, when fuel injection is initiated close to 90 degrees after top dead center and the injection takes place between 90 degrees and 120 degrees after top dead center, the injection timing controlled by the control unit 60 is such that when the spray reaches the inner wall surface of the combustion chamber (piston or bore wall), the piston is at the position similar to that illustrated in FIG. 4 and at that time the crank angle is, for example, close to 100 degrees after top dead center on the intake stroke. At that injection time, or closer to that time, when the injected fuel reaches the inner wall surface of the combustion chamber the central axis (straight line $L_S$ in FIG. 4) of the respective sprays injected from the fuel injection valve 20 having injection holes 101~106 arranged as above described are oriented towards a boundary portion A (the portion surrounded by the dotted line A in FIG. 4) formed opposite the fuel injection valve 20 by the crown surface of the piston 11 and the inner wall of the cylinder 10. In other words, in this example, the injection direction of the injection holes 101~106, the placement of the fuel injection valve 20 and the injection timing are configured so that the distance from the injection hole of the fuel injection valve 20 and the inner wall of the combustion chamber constituted by the crown surface of the piston 11 or the bore is longest when fuel is injected.

Figure 5:
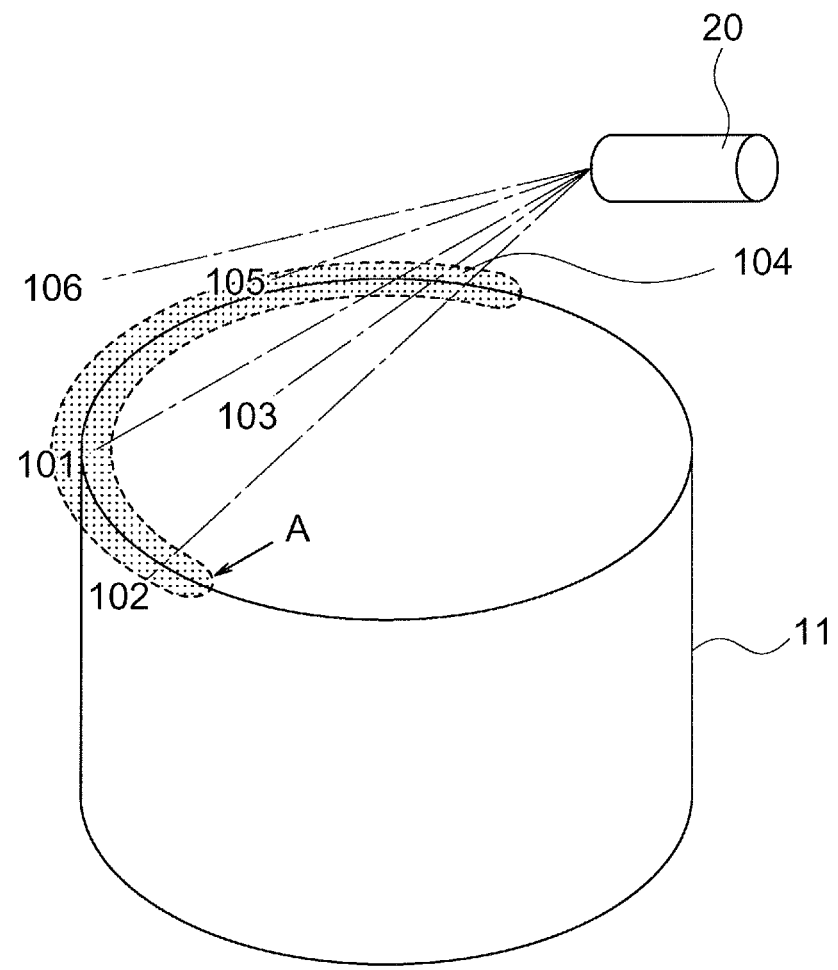
FIG. 5 is a perspective view of the piston and the combustion injection valve and is used to describe the appearance in the center of the spray within the combustion chamber in FIG. 1.

In the same manner as FIG. 4, FIG. 5 is a perspective view of the inside of the combustion chamber showing the appearance of the center of the spray when injection is performed between 90 degrees and 120 degrees after top dead center, and the spray reaches the inner wall (piston or bore wall) of the combustion chamber close to 100 degrees after top dead center on the intake stroke. The shaded section in FIG. 5 illustrates the boundary section A formed opposite the fuel injection valve 20 by the crown surface of the piston 11 and the inner wall of the cylinder 10. To prevent an increase in the degree of overlap between the sprays and thus the excess concentration of the fuel, the sprays are set to a certain degree with the boundary portion A as the center and injected from the injection hole 103 and the injection hole 106 which are alternately arranged at the top and bottom; however, the central axis of the injection hole 101 through to the injection hole 106 is generally oriented toward the boundary portion on the side opposite the fuel injection valve 20 formed by the crown surface of the piston 11 and the inner wall of the cylinder 10. More specifically, each of the central axes of the sprays injected from the injection holes 101, 102, 104, 105 of the present embodiment is definitely oriented towards the boundary portion A formed opposite the fuel injection valve 20 by the crown surface of the piston 11 and the inner wall of the cylinder 10.

In order to prevent an increase in the degree of overlap and thereby prevent the excess concentration of the fuel, the sprays adjacent perimeter-wise on the cylinder are oriented so that the centers spread out from each other when viewed in a plane. In this manner, the plurality of injection holes 101~106 are configured so that the central axes of the plurality of sprays injected from said plurality of injection holes 101~106 in the fuel injection valve 20 are oriented toward the boundary portion A opposite the fuel injection valve 20 formed at the piston position by the crown surface of the piston and the inner wall of the cylinder when fuel is injected. The overall spray which contains all the sprays from the injection holes 101~106 is injected so that the overall spray shape formed by all the sprays expands towards the cylinder head (upward) and spreads out so as to form one part of a conical shape that is dented near the piston (downward).

Hereby the fuel injected from the fuel injection valve 20 will be injected along the longest distance without an increase in the degree of overlap therebetween, and therefore it is possible to prevent the excess concentration of the fuel while controlling the adherence of the fuel to the crown surface of the piston 11 and the inner wall of the cylinder 10. In other words, the spray is oriented toward the vicinity of the boundary portion A when the crank angle is 100 degrees after top dead center, therefore on stratified-charge combustion, the injection must be delivered so that as much as possible the spray is the longest distance corresponding to the first injection delivered when the crank angle is between 90 degrees to 120 degrees after top dead center of the intake stroke.

Figure 6:
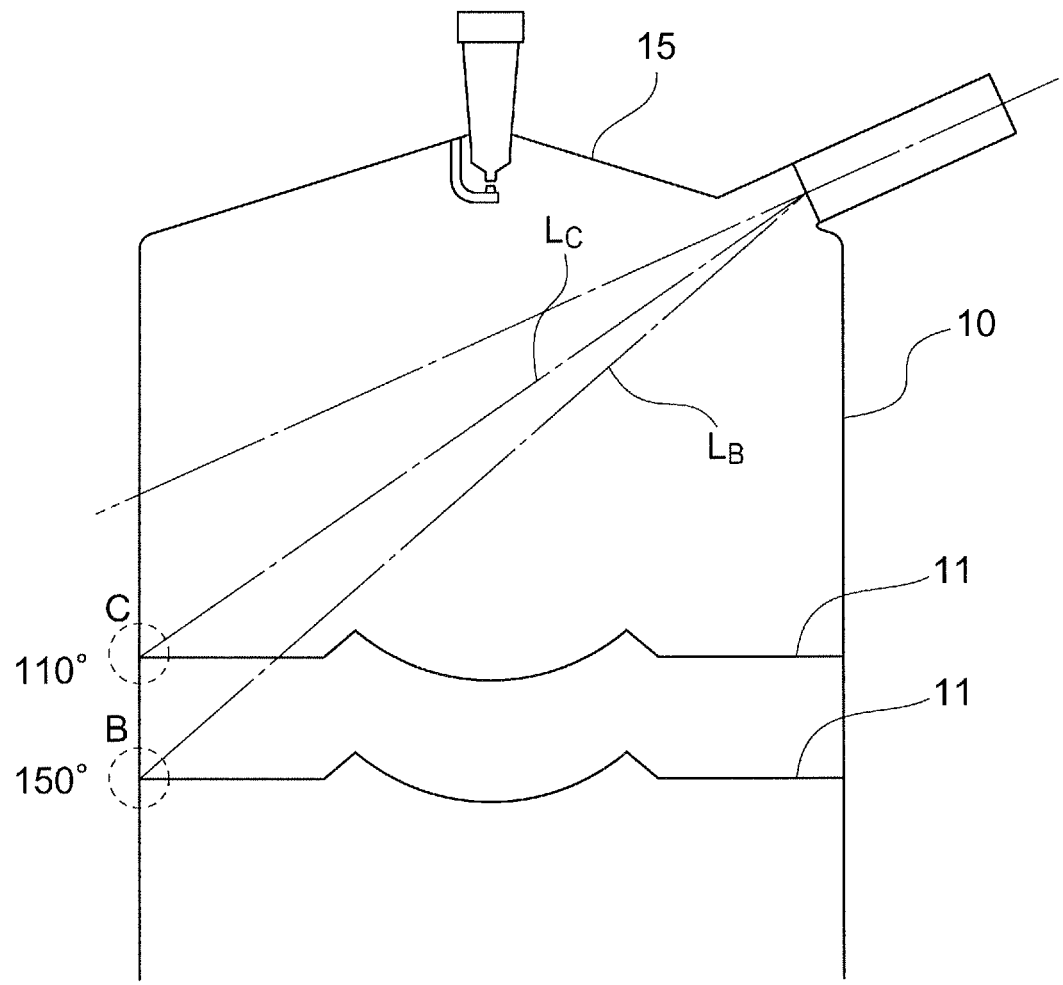
FIG. 6 is a diagram showing a view of the combustion chamber in FIG. 1 and is used to describe the relationship between the position of the piston and the central axis of the spray injected from the fuel injection valve.
Figure 7:
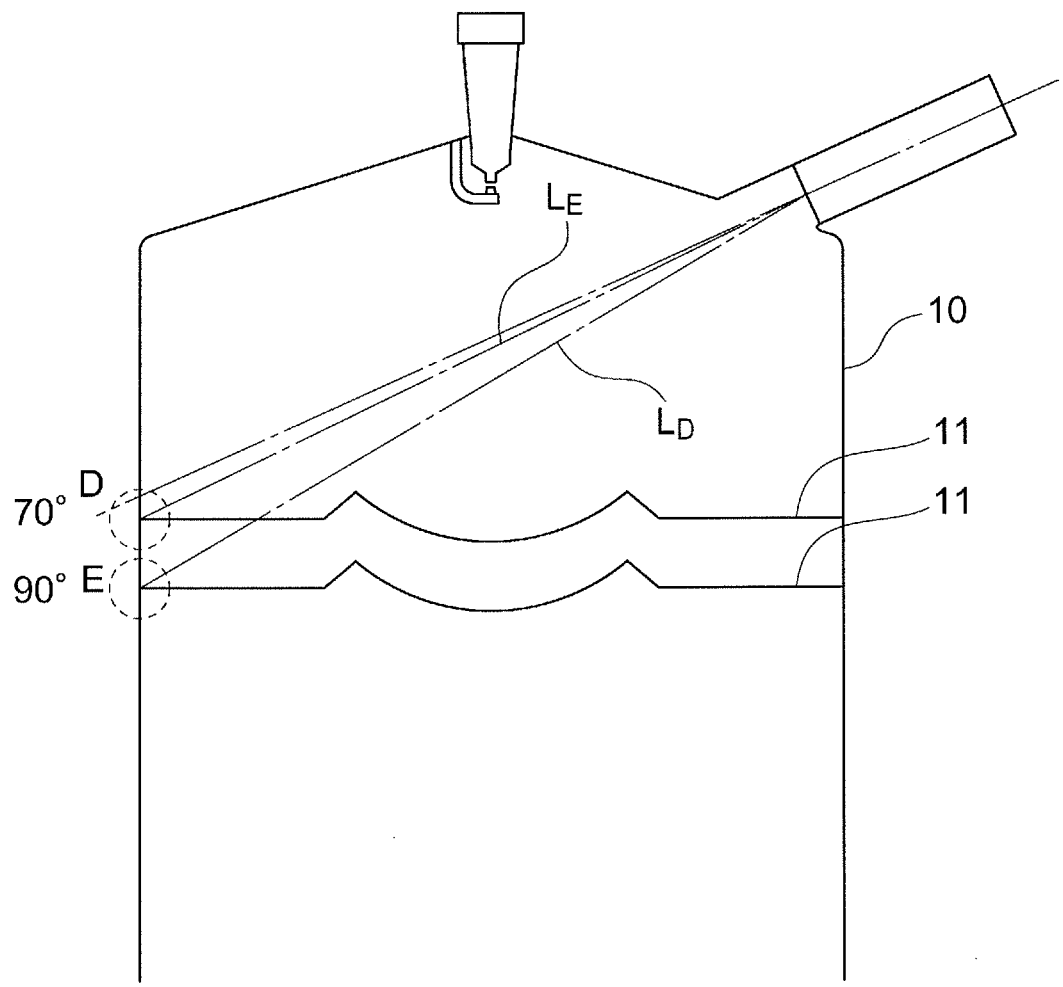
FIG. 7 is a diagram showing a view of the combustion chamber in FIG. 1 and is used to describe the relationship between the position of the piston and the central axis of the spray injected from the fuel injection valve.
Figure 8:
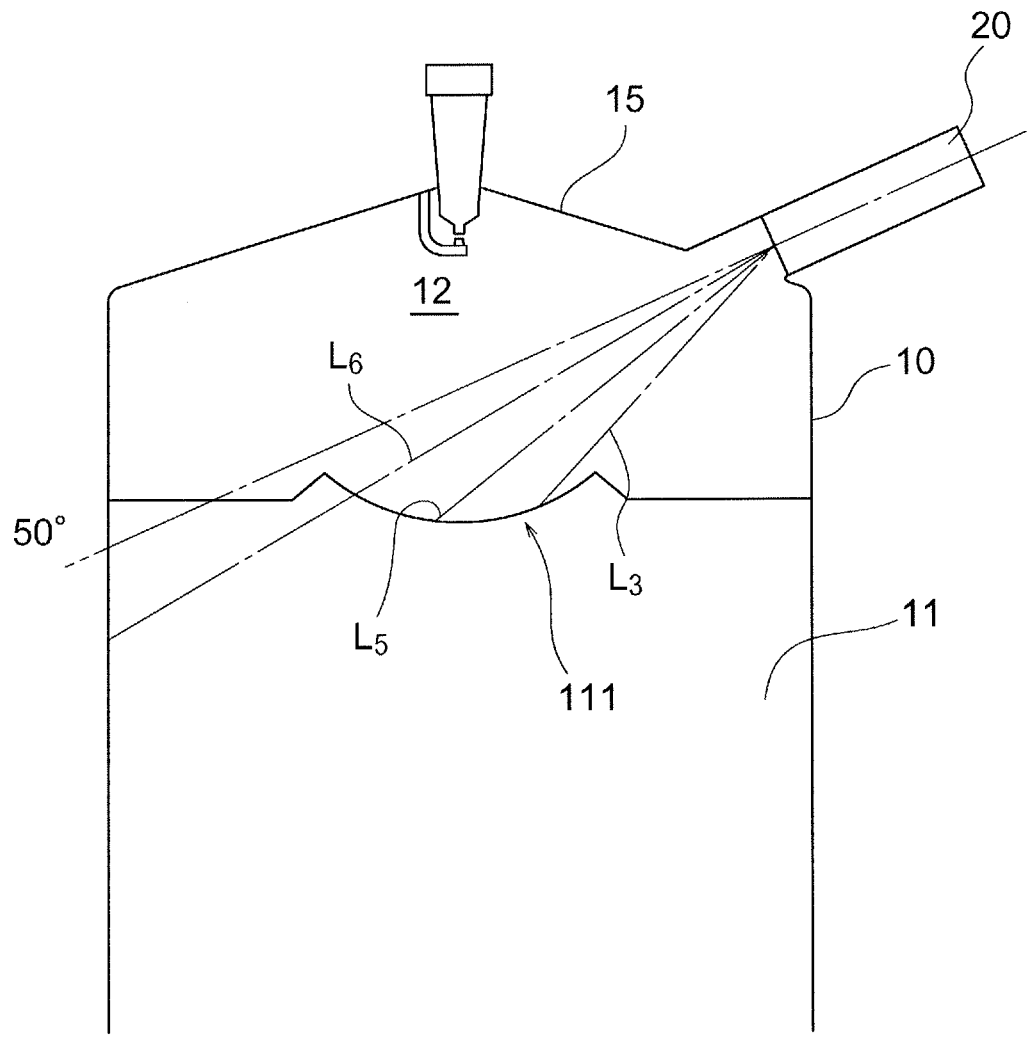
FIG. 8 is a diagram showing a view of the combustion chamber in FIG. 1 and is used to describe the relationship between the position of the piston and the central axis of the spray injected from the fuel injection valve.

Next, the orientation of the central axis will be described using FIG. 6 through FIG. 8 for the spray of fuel injected from the injection holes 101~106. FIG. 6 through FIG. 8 are cross-sectional views including the central axis of the cylinder and each show one portion of a block diagram for the engine when the cross-section. FIG. 6 through FIG. 8 will be used for describing the relationship between the position of the piston 11 and the central axis of the spray injected from the fuel injection valve 20. The angles illustrated in FIG. 6 through FIG. 8, namely 50°, 70°, 90°, 110°, 150° represent the crank angle. The crank angle is viewed as 0° when the piston is at top dead center. The position of the piston 11 in the drawing corresponds to the displayed crank angle.

In this example, the first condition is that the central axis of the spray injected from the injection hole 103 is arranged to be oriented closer to the bottom dead center than to the boundary portion A (when the crank angle is 100 degrees) and placed so that the central axis of the spray is not oriented towards at least the crown surface of the piston 11 when the crank angle is 150 degrees after top dead center on the intake stroke. This first condition is set because if the central axis of the spray injected from the injection hole 103 is oriented to the vicinity of the boundary portion A when the crank angle is 100 degrees after top dead center, the spray will overlap with the other sprays (lead to excess concentration). The central axis of the sprays injected from the injection holes 101, 102, 104, 105, 106 besides the injection hole 103 may be oriented towards the vicinity of the boundary portion A as previously described, with the boundary portion A formed by the crown surface of the piston 11 and the inner wall of the cylinder 10 when the crank angle is 100 degrees after top dead center; and further not oriented toward the crown surface of the piston when the crank angle is 110 degrees after top dead center on the intake stroke. That is, as shown in FIG. 6, the central axis of the spray injected from the injection hole 103 is arranged closer to the cylinder head 15 than a straight line (line $L_B$ in FIG. 6) from the boundary portion B to the center point in the tip portion of the fuel injection valve 20 at the crank angle of 150 degrees. Additionally the central axes of the sprays injected from the remaining injection holes 101, 102, 104~106 besides the injection hole 103 are arranged closer to the cylinder head 15 than a straight line (line $L_C$ in FIG. 6) from the boundary portion C to the center point in the tip portion of the fuel injection valve 20 at the crank angle of 110 degrees. In the same manner as the boundary portion A, the boundary portion B and the boundary portion C are opposite the fuel injection valve 20 and formed by the crown surface of the piston 11 and the inner wall of the cylinder. The boundary portion B is the boundary portion at the position of the piston 11 when the crank angle is 150 degrees, and the boundary portion C is the boundary portion at the position of the piston 11 when the crank angle is 110 degrees.

In addition, the second condition is that the central axis of the spray injected from the injection hole 106 is arranged to be oriented closer to the top dead center than to the boundary portion A (when the crank angle is 100 degrees) and placed so that the central axis of the spray is not oriented towards at least the inner wall of the cylinder 10 when the crank angle is 70 degrees after top dead center on the intake stroke. This second condition is set because if the central axis of the spray injected from the injection hole 106 is oriented to the vicinity of the boundary portion A when the crank angle is 100 degrees after top dead center, the spray will overlap with the other sprays (lead to excess concentration). The central axis of the sprays injected from the injection holes 101~105 besides the injection hole 106 may be oriented towards the vicinity of the boundary portion A as previously described, with the boundary portion A formed by the crown surface of the piston 11 and the inner wall of the cylinder 10 when the crank angle is 100 degrees after top dead center; and further not oriented toward the inner wall of the cylinder 101 when the crank angle is 90 degrees after top dead center on the intake stroke. That is, as shown in FIG. 7, the central axis of the spray injected from the injection hole 106 is arranged to be closer to the crankshaft 17 than the straight line (straight line $L_D$ in FIG. 7) from the boundary portion D to the center point of the tip portion of the fuel injection valve 20 at the crank angle of 70 degrees; the central axes of the sprays injected from the remaining injection holes 101~105 besides the injection hole 106 are arranged to be closer to the crankshaft 17 than the straight line (straight line $L_E$ in FIG. 7) from the boundary portion E to the center point in the tip portion of the fuel injection valve 20 at the crank angle of 90 degrees.

Moreover, a third condition is that the central axes of the sprays injected from the injection holes 101~106 are arranged oriented toward the inside of the cavity 111 provided in the crown surface of the piston 11 when the crank angle is closer to top dead center than 50 degrees before top dead center on the compression stroke. In other words, as shown in FIG. 8, the central axis ($L_3$) of the spray injected from the injection hole 103; the central axis ($L_6$) of the spray injected from the injection holes 106; and the central axis ($L_5$) of the spray injected from the injection holes 101, 102, 104, 105 which is between the central axis ($L_3$) and the central axis ($L_6$) are oriented toward the inside of the cavity 111 that is provided in the crown surface of the piston 11.

It is possible to adopt each of these conditions independently, however, the configuration in the above mentioned example (described with reference to FIG. 6 through FIG. 8) adopts both the first condition and the second condition where the sprays from the injection hole 103 and the injection hole 106 are respectively arranged vertically with some distance away from each other (on the boundary portion A). Ensuring both sprays are some distance away from each other thereby reliably ensures that overlap will not lead to excess concentration of the fuel.

The center point widthwise for the plurality of injection holes (the center in the X direction in FIG. 3) is set to be a relatively long distance from the injection hole to the boundary portion at the crown surface of the piston and the bore. Therefore, even when it is necessary to increase the number of injection holes and thus arrange more of the injection holes vertically (Y direction in FIG. 3), it is possible to reduce the amount of fuel (wall flow) that adheres to the crown surface of the piston or the bore inner wall if the overlap in the vertical direction is set from the center point widthwise (the center in the X direction in FIG. 3), as illustrated in the above mentioned example. If the number of injection holes increases, the area of each individual injection hole may be made relatively smaller to thus facilitate atomization of the fuel making up the spray.

In the present invention, when the control unit 60 directs the injection of the fuel at the above described injection timings for stratified charge combustion or for homogeneous combustion, it is possible to control the adherence of fuel to the crown surface of the piston by configuring the injection holes 101~106 to satisfy the above mentioned first condition. That is, on the whole, only the fuel from primarily the injection hole 103 is oriented toward the crown surface of the piston, and all it takes is for the fuel that has vaporized over a long distance to arrive at the piston. The first condition is established so that, in addition to taking into consideration an error or the like in the fuel pressure or amount, when the control unit 60 directs the injection of fuel at the injection timing a reduced amount of fuel is adhered to the crown surface of the piston 11. Thus reducing the fuel that adheres to the crown surface of the piston 11 thereby reduces the amount of particulate matter contained in the exhaust fumes, and therefore in this example the fuel injection valve 20 and the injection holes 101~106 are arranged to satisfy the above mentioned first condition to thereby reduce the particulate matter contained in the exhaust gas.

In the present invention, when the control unit 60 directs the injection of the fuel at the above described injection timings for stratified charge combustion or for homogeneous combustion, it is possible to control the adherence of fuel to the inner wall of the cylinder 10 by configuring the injection holes 101~106 to satisfy the above mentioned second condition. That is, on the whole, only the fuel from primarily the injection hole 106 is oriented toward the inner wall of the cylinder, and all it takes is for the fuel that has vaporized over a long distance to arrive at the inner wall. The second condition is established so that, in addition to taking into consideration an error or the like in the fuel pressure or amount, when the control unit 60 directs the injection of fuel at the injection timing a reduced amount of fuel is adhered to the inner wall of the cylinder 10. Hereby, in this example, arranging the fuel injection valve 20, and the injection holes 101~106 to satisfy the above mentioned second condition thereby reduces the amount of fuel that strikes the inner wall of the cylinder 10 and therefore prevents dilution of the oil on the cylinder wall.

In addition, in the present invention, when the control unit 60 directs the injection of the fuel at the above described injection timing for the stratified-charge combustion, setting the orientation of the injection holes 101~106 to satisfy the above mentioned third condition thereby ensures that the fuel injected is oriented towards the cavity 111 during stratified-charge combustion, therefore causing the fuel to buildup around the spark plug at ignition time and thus improve the stability of the engine startup during stratified-charge combustion cycle.

Figure 9:
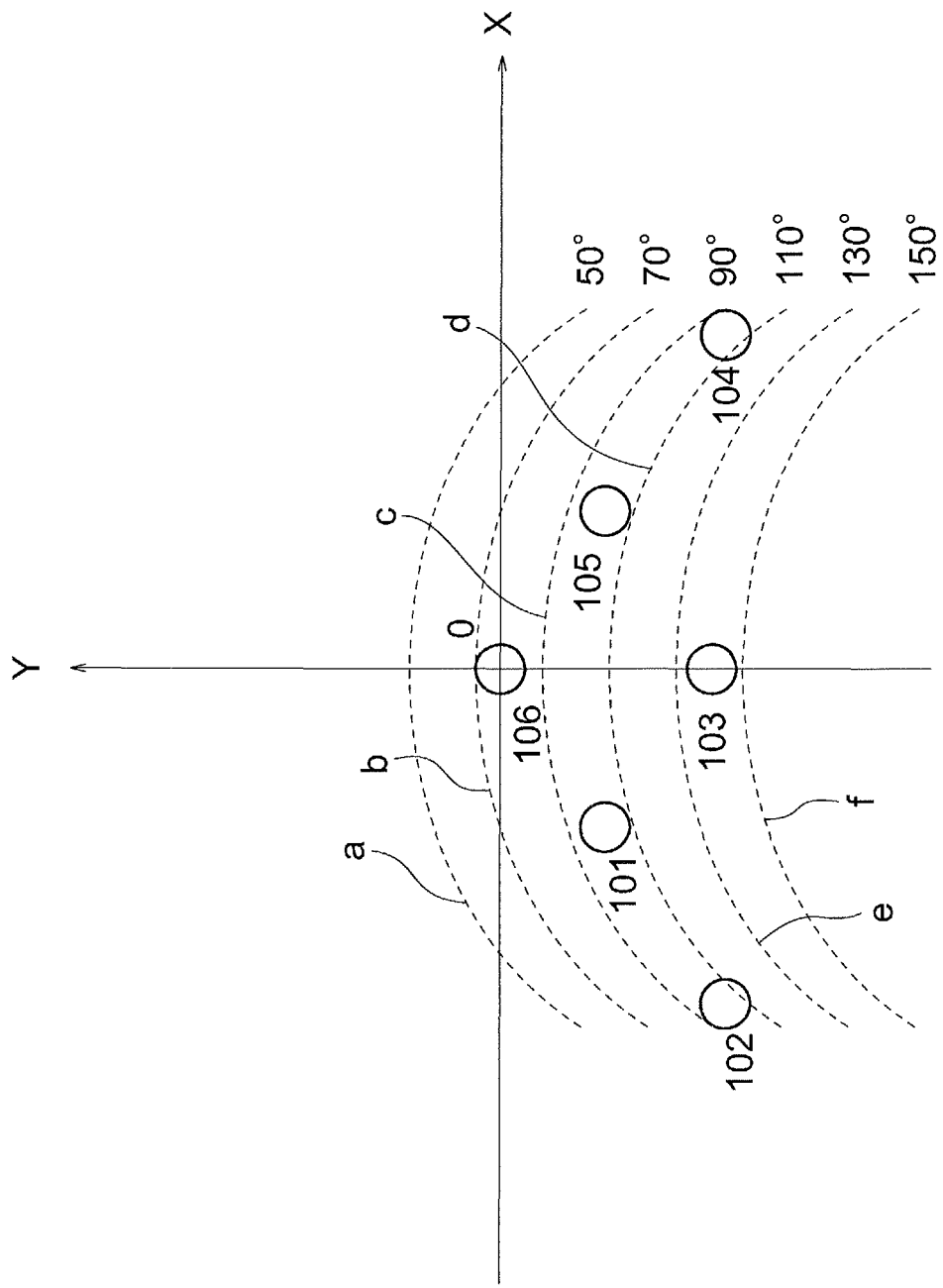
FIG. 9 is a diagram showing positional relationship between the position at which the central axis is oriented for the spray injected from the three injection holes in FIG. 3 and the boundary portion of the piston and the cylinder.

Here the positional relationship between the injection holes 101~106 in this example and the relationship between the above mentioned three conditions will be described using FIG. 9. FIG. 9 is a diagram for explaining for each crank angle, the positional relationship between the position at which the central axis is oriented for the spray injected from the three injection holes in FIG. 3 and the boundary portion between the piston 11 and the cylinder 10. In FIG. 9 the dotted lines a through f represent one portion of the boundary portion opposite the fuel injection valve 20 and formed by the crown surface of the piston 11 and the inner wall of the cylinder 10.

These dotted lines represent the position of the boundary portion when the crank angle is 50 degrees, 70 degrees, 90 degrees, 110 degrees, 130 degrees, and 150 degrees respectively. Moreover, the direction further positive than the dotted lines a through f in the Y-axis direction in FIG. 9 corresponds to closer to the inner wall of the cylinder 10 and the direction further negative than the dotted lines a through f in the Y-axis direction corresponds to closer to the crown surface of the piston 11. For example, when the crank angle is 100 degrees, the central axis for the sprays injected from the injection holes 101, 102, 104, 105 is oriented toward the boundary portion of the piston 11 and the cylinder 10; the central axis of the spray injected from the injection hole 106 is oriented at the inner wall of the cylinder 10, closer to the cylinder 10 than to the boundary portion, and the central axis of the spray injected from the injection hole 103 is oriented at the crown surface of the piston 11, closer to the piston 11 than to the boundary portion.

As shown in FIG. 9, when the crank angle is between 90 degrees and 120 degrees, let the fuel injection be initiated at 90 degrees and the start of fuel injection be taken as a reference point. While the spray progresses from the injection hole and the crank angle nears 100 degrees, at the very least the sprays injected from the injection holes 101, 102, 104~106 will appear closer to the positive direction of the Y-axis than the dotted line d. That is to say, the sprays injected from the injection holes 101, 102, 104~106 are oriented to start at the boundary portion of the piston 11 and the cylinder 10 and arrive close to the inner wall of the cylinder 10, and therefore satisfy the first condition and reduce adherence of the fuel to the crown surface of the piston 11. Further, the sprays from the injection holes 101~105 are more in the negative direction of the Y-axis than the dotted line c. That is to say, the sprays from the injection holes 101~105 are oriented to start at the boundary portion of the piston 11 and the cylinder 10 and arrive close to the piston 11, and therefore satisfy the second condition so that the fuel tends to not strike the inner wall of the cylinder. Moreover, when fuel is injected when the crank angle is 50 degrees near the top dead center, the center axes for the sprays injected from the injection holes 101~106 are further in the negative direction on the Y-axis than the dotted line a. That is to say, the injection holes 101~106 are oriented toward the cavity 111 provided in the crown surface of the piston 11, and therefore satisfy the third condition, and thus allow for stable startup of the engine using stratified-charge combustion.

As above mentioned, in this example the central axis of the spray injected from the fuel injection valve 20 is oriented towards the boundary portion opposite the fuel injection valve 20 formed at the piston position by the crown surface of the piston 11 and the inner wall of the cylinder 10 when fuel is injected. Hereby, the adherence of fuel to the crown surface of the piston 11 and the inner wall of the cylinder 10 may be controlled.

In addition, in this example, from among the plurality of injection holes 101~106, the injection hole 103 is placed closest to the piston 11; the central axis of the spray injected from the injection hole 103 is arranged so as to not be oriented toward the crown surface of the piston 11 when the crank angle is 150 degrees after top dead center on the intake stroke, while the central axes of the sprays injected from the remaining injection holes 101, 102, 104~106 besides the injection hole 103 are arranged so as not to be oriented toward the crown surface of the piston 11 when the crank angle is 110 degrees after top dead center on the intake stroke. Hereby, the adherence of fuel to the crown surface of the piston 11 may be reduced and thus reduce the amount of particulate matter contained in the exhaust gas.

In addition, in this example, from among the plurality of injection holes 101~106, the injection hole 106 is placed closest to the cylinder head 15; the central axis of the spray injected from the injection hole 106 is arranged so as to not be oriented toward the inner wall of the cylinder 10 when the crank angle is 70 degrees after top dead center on the intake stroke, while the central axes of the sprays injected from the remaining injection holes 101~105 besides the injection hole 106 are arranged so as not to be oriented toward the inner wall of the cylinder 10 when the crank angle is 90 degrees after top dead center on the intake stroke. Hereby, the fuel striking the inner wall of the cylinder 10 can be reduced to thereby control the dilution of oil on the cylinder wall.

Moreover, in this example, the respective central axes of the sprays injected from the plurality of injection holes 101~106 are oriented toward the cavity 111 provided in the crown surface of the piston 11 when the crank angle is closer to top dead center than 50 degrees before top dead center on the compression stroke. Hereby, in this example it is possible to improve the stability of engine startup during stratified-charge combustion.

In this example, the fuel is injected during stratified-charge combustion when the crank angle is between 90 degrees and 120 degrees after top dead center on the intake stroke, and when the crank angle is between 300 degrees and 340 degrees after top dead center on the intake stroke. Further, the fuel is injected during homogeneous combustion when the crank angle is between 80 degrees and 240 degrees after top dead center on the intake stroke. Hereby, the injection timing may be set under the kind of condition where the particulate matter contained in the exhaust gas may be reduced.

Figure 10:
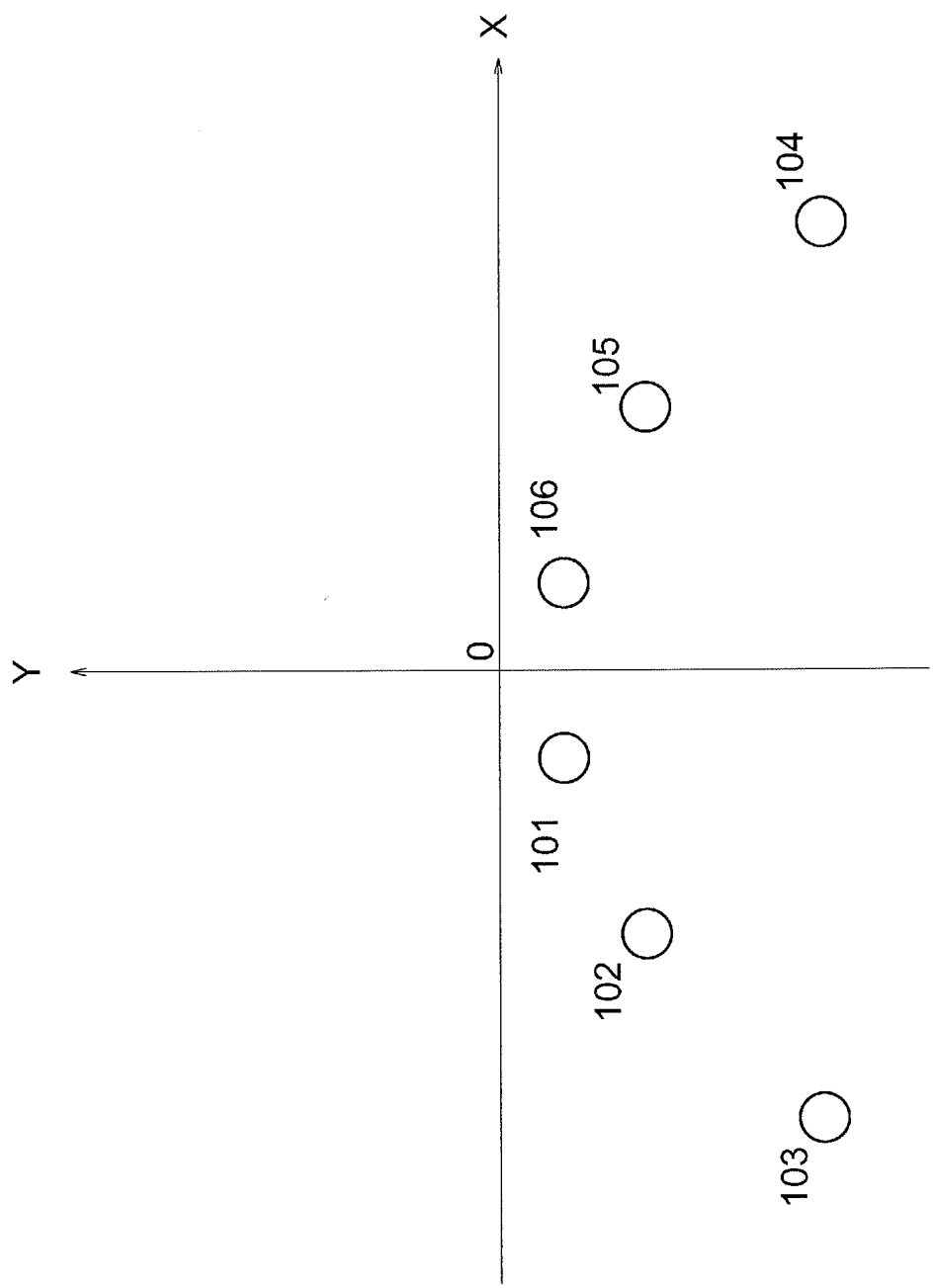
FIG. 10 is a diagram showing positional relationship between the position at which the central axis is oriented for the spray injected from a modified example of the three injection holes in FIG. 3 and the boundary portion of the piston and the cylinder.

Moreover, while in this example the injection holes 101~106 are arranged as shown in FIG. 3, the injection holes 101~106 may also be arranged as shown in FIG. 10. FIG. 10 is a partial cross-sectional view along the line III-III in FIG. 2 and is for describing the central axis of the spray injected from the injection holes of the fuel injection valve 20.

As shown in FIG. 10, the six injection holes 101~106 are placed along a curve in the same plane and are placed symmetrically about the Y-axis. Of the six injection holes 101~106, both the injection hole 101 and the injection hole 106 are at the most positive end of the Y-axis and are placed with the shortest gap therebetween. The injection hole 102 and the injection hole 105 are the second closest to the positive end of the Y-axis and have the second shortest gap therebetween. Finally, the injection hole 103 and the injection hole 104 are at the most negative end of the Y-axis and a placed with the longest gap therebetween.

When the injection holes 101~106 are lined up to correspond with the boundary portion of the piston 11 and the cylinder 10 (there are no injection holes arranged vertically) as shown in FIG. 10, in this example, the central axes of the sprays injected from the injection holes 101~106 are arranged oriented toward the crown surface of the piston 11 when the crank angle is 110 degrees after top dead center on the intake stroke. Hereby, the adherence of fuel to the crown surface of the piston 11 may be reduced and thus reduce the amount of particulate matter contained in the exhaust gas.

Moreover in the aforementioned case, for this example, the central axes of the sprays injected from the injection holes 101~106 are arranged so as not to be oriented toward the inner wall of the cylinder 10 when the crank angle is 90 degrees after top dead center on the intake stroke. Hereby, the fuel striking the inner wall of the cylinder 10 can be reduced to thereby control the dilution of the engine lubricating oil on the cylinder wall.

Finally, while for this example the case of providing six injection holes 101~106 was described, there is no need to configure six injection holes 101~106; there may be five injection holes.

Moreover, the control unit 60 in this example corresponds to the "fuel injection valve control means" in the present invention.

Figure 11:
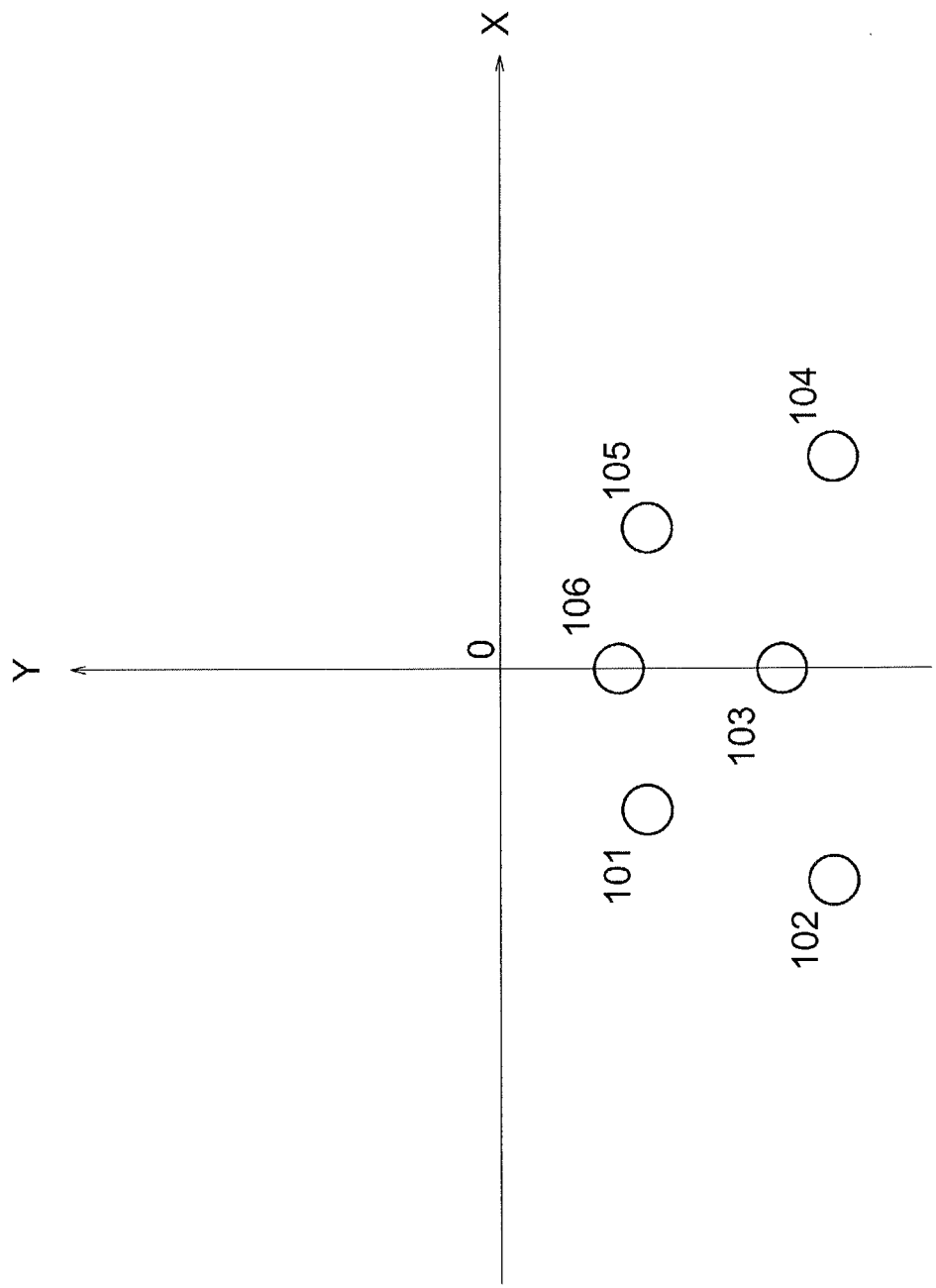
FIG. 11 is a diagram for explaining the central axis of the spray from the injection holes of the fuel injection valve in an engine according to another embodiment of the present invention.

FIG. 11 is a diagram for explaining the central axis of the spray injected from the injection holes of the fuel injection valve 20 in an engine according to another embodiment of the present invention. This example differs from the above described first embodiment in that the conditions added include vectors that represent the direction of the sprays. Beyond this, the configuration is similar to that of the above described first embodiment and that descriptions are invoked here. FIG. 11 is a partial cross-sectional view along the line III-III in FIG. 2.

The placement of the sprays injected from the six injection holes 101~106 are along the line III-III of FIG. 2 in the cross-section as shown in FIG. 11. This placement is substantially the same as the placement of the injection holes 101~106 in the tip portion of the fuel injection valve 20; the axial line for each of the sprays injected from the injection holes 101~106 spread out and progress while mutually maintaining a similar shape. The six injection holes 101~106 are placed symmetrically about the center line of the six injection holes 101~106 (corresponding to the straight line III-III, and the Y-axis in FIG. 11), with the injection hole 103, and the injection hole 106 being place on the center line. The injection hole 106 is place closer to the piston than the central axis of the fuel injection valve 20 (straight line $L_1$ in FIG. 2); and the injection hole 103 is placed below the position of the injection hole 106 closest to the piston 11.

The injection hole 101 and the injection hole 105 are placed symmetrically with respect to the Y-axis, and the injection hole 102 and the injection hole 104 are placed symmetrically about the Y-axis In the X-axis direction, the injection hole 101 is placed between the injection hole 103 and the injection hole 106, and the injection hole 102; in the Y-axis direction the injection hole 101 is placed between the injection hole 102, and the injection hole 103. In the X-axis direction, the injection hole 105 is placed between the injection hole 103 and the injection hole 106, and the injection hole 104; and in the Y-axis direction the injection hole 105 is placed between the injection hole 103, and the injection hole 104.

In the present invention, the third condition according to the first embodiment is that the central axes of the sprays injected from the injection holes 101~106 are arranged oriented toward the inside of the cavity 111 provided in the crown surface of the piston 11 when the crank angle is closer to top dead center than 50 degrees before top dead center on the compression stroke. Further, not only is the spray of fuel directed towards the cavity 111, in the present invention the following conditions have been added to more effectively orient the sprays of fuel toward the spark plug 31.

Figure 12:
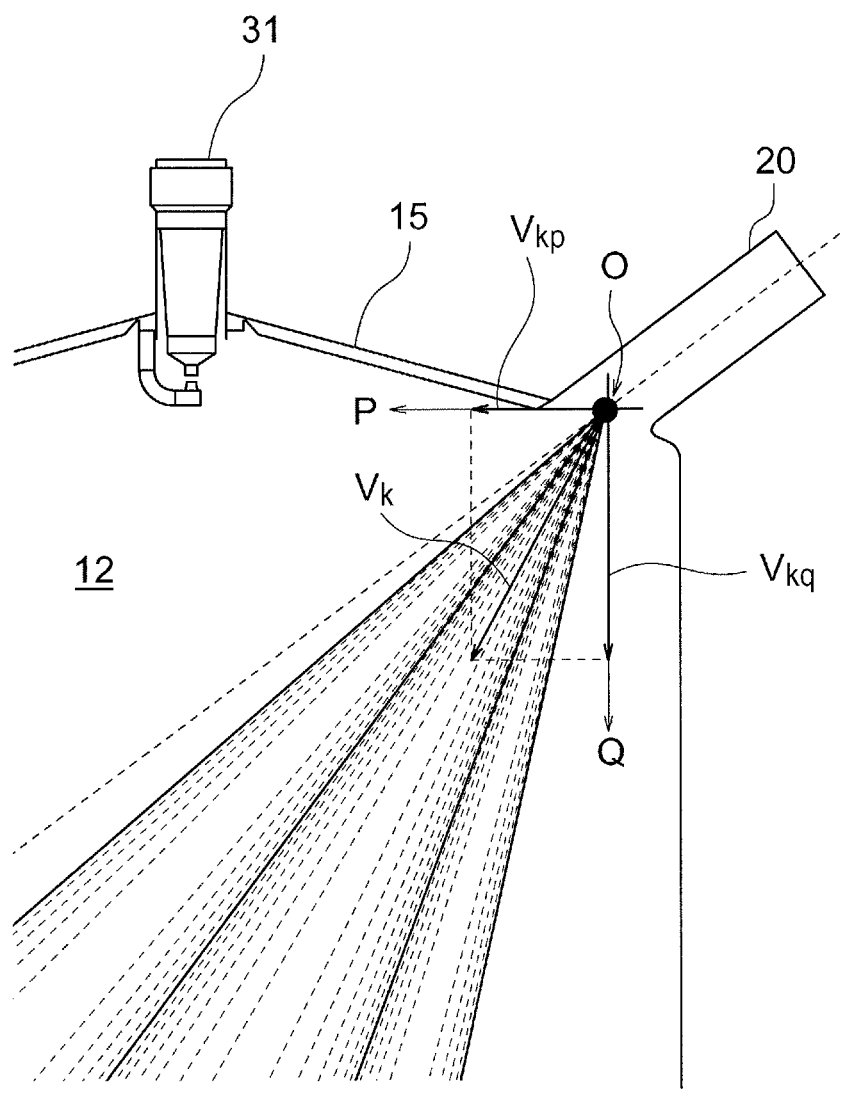
FIG. 12 is an exploded view of the portions surrounding the fuel injection valve in the engine according to another embodiment of the present invention and shows the spray injected from the fuel injection valve.

FIG. 12 is a cross-sectional diagram of the combustion chamber 12 and will be used to explain the sprays injected from the fuel injection valve 20. The plurality of injection holes 101~106 are each oriented towards different directions as above described. Furthermore, vectors may be used to represent the orientation of each of the injection holes 101~106. The vectors for the injection holes 101~106 are vectors on (along) the central axis of the injection holes 101~106. Here, the size of the vectors for the injection holes 101~106 will all be the same size (scalar quantity).

The sprays for the injection holes 101~106 are injected from a center point (point O in FIG. 12) on the tip portion of the fuel injection valve 20 and spread out to form a conical shape where the central axis of the spray is the center thereof. Therefore the start point for the vectors of the injection holes 101~106 will be the aforementioned center point. Further, the vector ($V_k$) in FIG. 12 represents the summation of all the vectors representing the injection holes 101~106. The summation vector corresponds to the center of the direction of the overall spray from the injection holes 101~106.

The vector components of the summation vector ($V_k$) may be broken down into a component in the direction (P-axis in FIG. 12) perpendicular to the axis of movement of the piston 11 and toward the spark plug, and a component in the direction (Q-axis in FIG. 12) along the axis of movement of the piston 11 and toward the piston 11 in a plane including the summation vector ($V_k$) and the axis of movement of the piston 11 (the central axis of the cylinder 10). The vector ($V_{kp}$) will represent the summation vector ($V_k$) component in the P-axis direction, and the vector ($V_{kq}$) will represent the summation vector ($V_k$) component in the Q-axis direction, as shown in FIG. 12.

Thus, the fourth condition is that the central axes of the injection holes 101~106 are placed so that the scalar quantity of the summation vector ($V_k$) in the P-axis direction (the P-axis component of $V_k$) is 40%-50% of the scalar quantity (the size) of the summation vector ($V_k$). That is to say, the central axes of the injection holes 101~106 are placed so that the percentage of the scalar quantity of the vector ($V_{kp}$) with respect to the scalar quantity of the summation vector ($V_k$) is 40%-50%.

Hereby the spray oriented towards the direction of the spark plug 31 from injection holes 101~106 is set to within a constant range while the spray may also be oriented toward the cavity 111; therefore, a highly ignitable gaseous mixture may be produced around the spark plug 31 while controlling the amount of fuel injected during stratified-charge combustion. As a result, it is possible to realize a more stable stratified-charge combustion process, to reduce the unburned hydrocarbon (HC), and further reduce the particulate matter contained in the exhaust gas.

To further improve the efficacy of stable retard combustion as well as the reduction of toxic substances in the exhaust gas, the second embodiment places the central axes of the injection holes 101~106 so that the scalar quantity of the summation vector ($V_k$) in the P-axis direction is between 44.3%-48.3% (range of 46.3±2%) of the scalar quantity of the summation vector ($V_k$).

Furthermore, in the second embodiment, the P-axis direction is a direction perpendicular to the axis of movement of the piston 11 in the cross-section including the axis of movement of the piston and the summation vector ($V_k$). In other words, the P-axis direction is a direction along a straight line (straight line in the radial direction of the cylinder 10) intersecting perpendicularly with a line that extends from the center point (O in FIG. 12) in the tip portion of the fuel injection valve 20 toward a vertical line to the spark plug 31. In other words, the P-axis direction is the radial direction of the cylinder 10 opposite the bore through which the central axis (straight line $L_1$ in FIG. 2) of the fuel injection valve 20 is oriented.

The invention claimed is:

1. An internal combustion engine having a combustion chamber defined by a piston and a cylinder, and a fuel injection valve having a plurality of injection holes and placed close to an intake valve so as to inject fuel directly inside the cylinder from the side of the combustion chamber, the internal combustion engine characterized in that:

the plurality of injection holes are configured so that the spray shape which is the overall shape formed by the plurality of sprays injected from the plurality of injection holes in the fuel injection valve expands toward the cylinder head and forms one part of a conical shape that is dented near the piston; and each of the central axes of a plurality of sprays injected from a plurality of specific injection holes is oriented toward a boundary portion near the exhaust valve formed at the piston position by the crown surface of the piston and the inner wall of the cylinder when fuel is injected, and among said plurality of injection holes, the central axis is oriented closer to the bottom dead center than to the boundary portion for the spray injected from one injection hole not included among said plurality of specific injection holes.

2. The internal combustion engine according to claim 1, wherein among the plurality of injection holes, the central axis of the spray injected from the injection hole closest to the piston is placed so as not to be oriented toward the crown surface of the piston when a crank angle is 150 degrees after top dead center on an intake stroke; and among the plurality of injection holes, the central axes are placed so as not to be oriented toward the crown surface of the piston when the crank angle is 110 degrees after top dead center on the intake stroke for the sprays injected from the remaining injection holes besides the injection hole closest to the piston.

3. The internal combustion engine according to claim 1, wherein among the plurality of injection holes, the central axis of the spray injected from the injection hole closest to the cylinder head is placed so as not to be oriented toward the inner wall of the cylinder when the crank angle is 70 degrees after top dead center on an intake stroke; and among the plurality of injection holes, the central axes are placed so as not to be oriented toward the cylinder head when the crank angle is 90 degrees after top dead center on the intake stroke for the sprays injected from the remaining injection holes besides the injection hole closest to the cylinder head.

4. The internal combustion engine according to claim 1, wherein each of the central axes for the sprays injected from the plurality of injection holes is placed so as not to be oriented toward the crown surface of the piston when the crank angle is 110 degrees after top dead center on an intake stroke.

5. The internal combustion engine according to claim 1, wherein each of the central axes for the sprays injected from the plurality of injection holes is placed so as not to be oriented toward the inner wall of the cylinder when the crank angle is 90 degrees after top dead center on an intake stroke.

6. The internal combustion engine according to claim 1, wherein each of the central axes for the sprays injected from the plurality of injection holes is placed so as to be oriented toward a cavity provided in the crown surface of the piston when a crank angle is closer to top dead center than 50 degrees before top dead center on a compression stroke.

7. The internal combustion engine according to claim 6, wherein a summation vector of vectors representing the direction of the sprays on the respective central axes of the sprays injected from the plurality of injection holes, and a component of the summation vector which is included a plane containing an axis of movement of the piston, and which moves in a direction perpendicular to said axis of movement are such that the component is between 40% and 50% of a size of the summation vector.

8. The internal combustion engine according to claim 1, further comprising:

a fuel injection valve control unit programmed to control the fuel injection valve to inject fuel during stratified-charge combustion when a crank angle is between 90 degrees and 120 degrees after top dead center on an intake stroke, and when the crank angle is between 300 degrees and 340 degrees after top dead center on the intake stroke; and the fuel injection valve control unit being further programmed to control the fuel injection valve to inject fuel during homogeneous combustion when the crank angle is between 80 degrees and 240 degrees after top dead center on the intake stroke.

9. The internal combustion engine according to claim 2, wherein among the plurality of injection holes, the central axis of the spray injected from the injection hole closest to the cylinder head is placed so as not to be oriented toward the inner wall of the cylinder when the crank angle is 70 degrees after top dead center on the intake stroke; and among the plurality of injection holes, the central axes are placed so as not to be oriented toward the cylinder head when the crank angle is 90 degrees after top dead center on the intake stroke for the sprays injected from the remaining injection holes besides the injection hole closest to the cylinder head.

10. The internal combustion engine according to claim 4, wherein each of the central axes for the sprays injected from the plurality of injection holes is placed so as not to be oriented toward the inner wall of the cylinder when the crank angle is 90 degrees after top dead center on the intake stroke.

11. The internal combustion engine according to claim 2, wherein each of the central axes for the sprays injected from the plurality of injection holes is placed so as to be oriented toward a cavity provided in the crown surface of the piston when the crank angle is closer to top dead center than 50 degrees before top dead center on a compression stroke.

12. The internal combustion engine according to claim 11, wherein a summation vector of vectors representing the direction of the sprays on the respective central axes of the sprays injected from the plurality of injection holes, and a component of the summation vector which is included a plane containing an axis of movement of the piston, and which moves in a direction perpendicular to said axis of movement are such that the component is between 40% and 50% of a size of the summation vector.

13. The internal combustion engine according to claim 2, further comprising a fuel injection valve control unit programmed to control the fuel injection valve to inject fuel during stratified-charge combustion when a crank angle is between 90 degrees and 120 degrees after top dead center on an intake stroke, and when the crank angle is between 300 degrees and 340 degrees after top dead center on the intake stroke; and the fuel injection valve control unit being further programmed to control the fuel injection valve to inject fuel during homogeneous combustion when the crank angle is between 80 degrees and 240 degrees after top dead center on the intake stroke.

* * * * *